(12) United States Patent
Ichikawa et al.

(10) Patent No.: US 8,039,085 B2
(45) Date of Patent: Oct. 18, 2011

(54) HONEYCOMB STRUCTURE

(75) Inventors: Syuichi Ichikawa, Handa (JP); Koichi Iwata, Kani (JP); Naoshi Masukawa, Nishikasugai-gun (JP); Atsushi Watanabe, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 595 days.

(21) Appl. No.: 11/597,868

(22) PCT Filed: Mar. 7, 2006

(86) PCT No.: PCT/JP2006/304397
§ 371 (c)(1),
(2), (4) Date: Nov. 29, 2006

(87) PCT Pub. No.: WO2006/098191
PCT Pub. Date: Sep. 21, 2006

(65) Prior Publication Data
US 2008/0187712 A1    Aug. 7, 2008

(30) Foreign Application Priority Data

Mar. 16, 2005   (JP) ................................. 2005-074354

(51) Int. Cl.
*B32B 3/12* (2006.01)
*B01D 39/06* (2006.01)
(52) U.S. Cl. .......................................... 428/116; 55/523
(58) Field of Classification Search ........................ None
See application file for complete search history.

(56) References Cited

U.S. PATENT DOCUMENTS

| 2005/0016140 A1* | 1/2005 | Komori et al. .................. 55/523 |
| 2005/0050845 A1 | 3/2005 | Masukawa et al. |
| 2005/0160710 A1 | 7/2005 | Taoka et al. |
| 2005/0214504 A1 | 9/2005 | Yoshida |

FOREIGN PATENT DOCUMENTS

| EP | 1 489 274 A1 | 12/2004 |
| EP | 1 550 494 A1 | 7/2005 |
| EP | 1 550 646 A1 | 7/2005 |
| JP | A 08-28246 | 1/1996 |
| JP | A 2004-051384 | 2/2004 |
| JP | A 2004-130176 | 4/2004 |
| JP | A 2004-261623 | 9/2004 |
| WO | WO 03/074848 A1 | 9/2003 |
| WO | WO 2004/031101 A1 | 4/2004 |
| WO | WO 2004/33070 A1 | 4/2004 |
| WO | WO 2004/63123 A1 | 7/2004 |

* cited by examiner

*Primary Examiner* — Gordon R Baldwin
(74) *Attorney, Agent, or Firm* — Oliff & Berridge, PLC

(57) ABSTRACT

There is provided a honeycomb structure 10 comprising a honeycomb segment joined body 10 having a plurality of honeycomb segments 2 integrally joined with one another at a joint face of each of the honeycomb segments by means of a bonding material layer 9 and having a plurality of cells 5 functioning as fluid passages disposed in parallel with one another in a direction of central axis. Porosity in an outside portion of the bonding material layer 9 (portion from the interface of the joint face of honeycomb segments to the point corresponding to 20% thickness of the total bonding material layer) is smaller than that in the central portion located on the inner side of the outside portion.

9 Claims, 3 Drawing Sheets

HONEYCOMB STRUCTURE

FIELD OF THE INVENTION

The present invention relates to a honeycomb structure where a plurality of honeycomb segments are integrally joined with one another by means of a bonding material layer. More particularly, the present invention relates to a honeycomb structure which is useful as a trapping filter for exhaust gas, particularly as a diesel particulate filter for trapping particulate matter or the like in exhaust gas from a diesel engine, which is excellent in thermal shock resistance, and where a defect such as a crack is securely inhibited from generating particularly upon regenerating the filter.

BACKGROUND OF THE INVENTION

A honeycomb structure is incorporated into an exhaust gas system or the like of a diesel engine as a trapping filter for exhaust gas, for example, a diesel particulate filter (DPF) for trapping and removing particulate matter contained in exhaust gas from a diesel engine or the like.

Such a honeycomb structure has a structure in which a plurality of cells partitioned by porous partition walls made of, for example, silicon carbide (SiC) and functioning as fluid passages are disposed in parallel with one another in the direction of the central axis. End portions of adjacent cells are alternately plugged (in a checkerwise pattern). That is, a cell has an open end on one side and a closed end on the other side, and other cells adjacent to the cell have a closed end on one side and an open end on the other side.

By such a structure, exhaust gas can be purified by allowing the gas flowing into predetermined cells (inflow cells) from an end portion to pass through porous partition walls and flow out via the cells (outflow cells) adjacent to the inflow cells, thereby allowing the partition walls to trap particulate matter in exhaust gas when the exhaust gas passes through the partition walls.

In order to use such a honeycomb structure (filter) continuously for a long period of time, it is necessary for the filter to be regenerated. That is, in order to reduce an increase in pressure loss by particulate matter accumulation inside the filter in the course of time, it is necessary to remove particulate matter accumulating inside the filter by combustion. A high thermal stress is generated upon this regeneration of a filter, and there arises a problem of occurrence of defects such as cracks and breakage in a honeycomb structure by the thermal stress. To cope with a request of improving a thermal shock resistance against such a thermal stress, there has been proposed a honeycomb structure having a block structure having a function of dispersing and releasing the thermal stress by integrally joining a plurality of honeycomb segments by means of a bonding material layer, and the thermal shock resistance has been improved to some extent. Such a honeycomb structure having a block structure has a structure in which a plurality of segments each having a shape constituting a part of the whole structure and having a shape constituting the whole structure by joining with one another in the direction perpendicular to the central axis are integrally joined by means of a bonding material layer so that a cross-section of the whole structure taken along a plane perpendicular to the central axis has a predetermined shape such as a circle, followed by coating the outer peripheral surface with a coating material.

However, enlargement of a filter has further been required, and the thermal stress caused by regeneration of filter has increased. Therefore, in order to prevent the above defects, improvement in thermal shock resistance as a structure is strongly desired. Particularly, a bonding material layer for integrally joining a plurality of honeycomb segments is desired to achieve a honeycomb structure having an excellent thermal shock resistance by achieving an excellent stress-releasing function and bonding strength.

To cope with such a problem, there is disclosed a ceramic structure (honeycomb structure) where it is planned to inhibit occurrence of migration in the drying/curing process and inhibit occurrence of the above defects to improve durability by adding inorganic fiber and an organic binder to a sealing material (bonding material layer) (see Patent Document 1).
Patent Document 1: Japanese Patent No. 3121497

DISCLOSURE OF THE INVENTION

However, in a sealing material (bonding material layer) used for a ceramic structure (honeycomb structure) disclosed in Patent Document 1, there is a problem of difficulty in securing both bonding strength at an interface between a segment and a bonding material layer and a stress-releasing function of the bonding material layer in a homogeneous composition achieved by intertwining mutually with inorganic fiber and an organic binder.

The present invention has been made in view of the above problem and aims to provide a honeycomb structure which is useful as a trapping filter for exhaust gas, particularly as a diesel particulate filter for trapping particulate matter or the like in exhaust gas from a diesel engine, which is excellent in thermal shock resistance, and where a defect such as a crack is securely inhibited from generating particularly upon regenerating the filter.

In order to achieve the above object, there is provided the following honeycomb structure according to the present invention.

[1] A honeycomb structure comprising a honeycomb segment joined body having a plurality of honeycomb segments integrally joined with one another at a joint face of each of the honeycomb segments by means of a bonding material layer and having a plurality of cells functioning as fluid passages disposed in parallel with one another in a direction of central axis,
wherein porosity in an outside portion of the bonding material layer (portion from the interface of the joint face of honeycomb segments to the point corresponding to 20% thickness of the total bonding material layer) is smaller than that in the central portion located on the inner side of the outside portion.

[2] The honeycomb structure according to the above [1], wherein the bonding material layer satisfies the relation of strength (MPa)/Young's modulus (GPa)>$1.0 \times 10^{-3}$.

[3] The honeycomb structure according to the above [1], wherein the bonding material layer satisfies the relation of strength (MPa)/Young's modulus (GPa)>$2.5 \times 10^{-3}$.

[4] The honeycomb structure according to [1], wherein the bonding material layer satisfies the relation of strength (MPa)/Young's modulus (GPa)>$3.5 \times 10^{-3}$.

[5] The honeycomb structure according to any one of the above [1] to [4], wherein the outside portion of the bonding material layer has a porosity of 5 to 40%, and the central portion has a porosity of 25 to 90%.

[6] The honeycomb structure according to any one of the above [1] to [4], wherein the outside portion of the bonding material layer has a porosity of 10 to 30%, and the central portion has a porosity of 30 to 70%. [7] The honeycomb structure according to any one of the above [1] to [6], wherein the bonding material layer contains an inorganic fiber with the inorganic fiber content ratio of 20 to 45% by mass and the shot content ratio of 10 to 50% by mass, and it has an average diameter of 1 to 20 μm in a cross-section perpendicular to the longer axial direction and an average length of 10 to 600 μm in the longer axial direction.

[8] The honeycomb structure according to any one of the above [1] to [7], wherein the bonding material layer has a thickness of 0.5 to 3 mm.

[9] The honeycomb structure according to any one of the above [1] to [8], wherein the honeycomb segment is constituted by silicon carbide (SiC) or by silicon-silicon carbide based composite material produced by the silicon carbide (SiC) as a framework and silicon (Si) as a bonding material.

DESCRIPTION OF REFERENCE NUMERALS

1: honeycomb structure, 2: honeycomb segment, 4: coating member, 5: cell, 6: partition wall, 7: filler, 9: bonding material layer, 10: honeycomb segment joined body

BEST MODE FOR CARRYING OUT THE INVENTION

Figure 1:
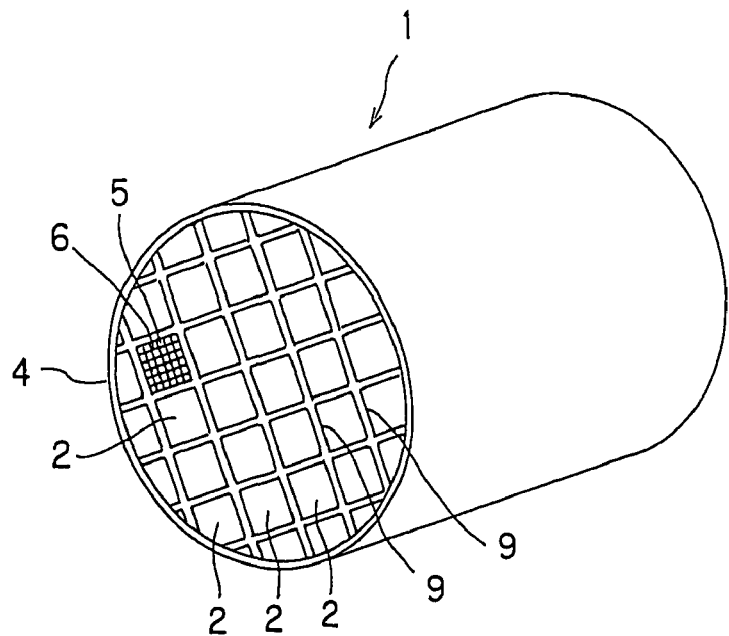
FIG. 1 is a perspective view schematically showing an embodiment (having a circular cross-section of the whole structure taken along a plane perpendicular to the central axis) of a honeycomb structure of the present invention.
Figure 2:
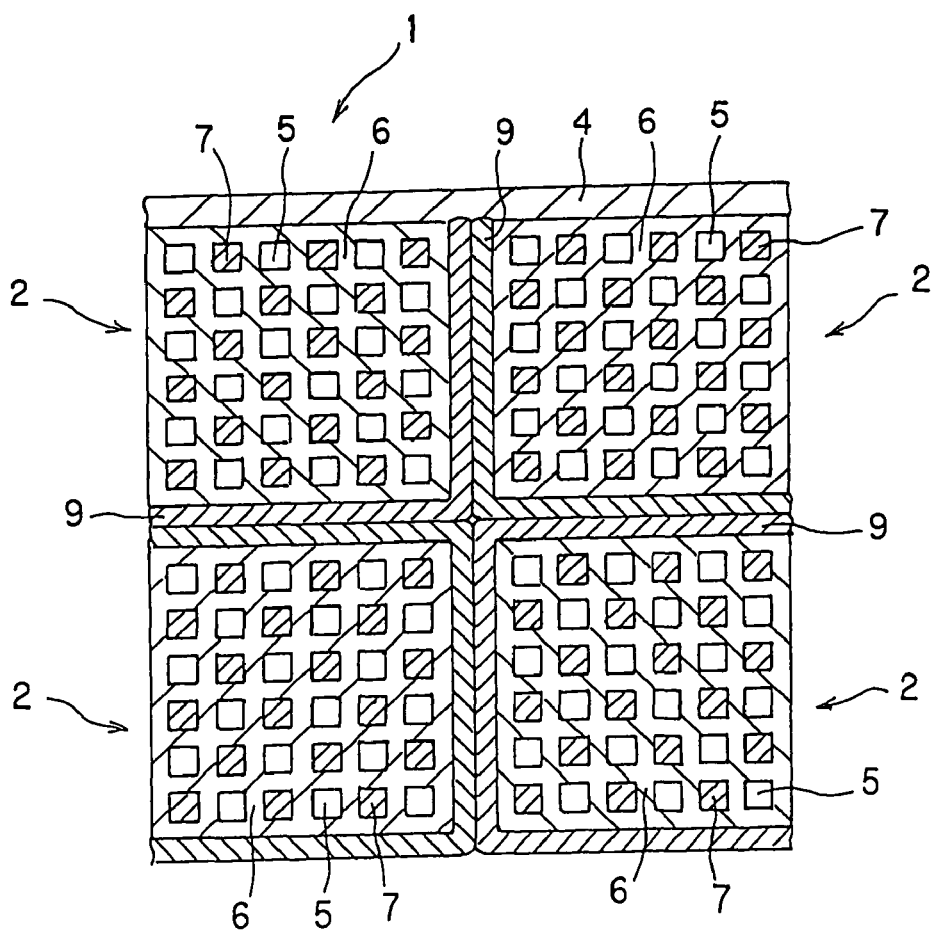
FIG. 2 is a front view shown from an end face side showing a part of another embodiment (having a square cross-section of the whole structure taken along a plane perpendicular to the central axis) of a honeycomb structure of the present invention.

As shown in FIGS. 1 and 2, a honeycomb structure 1 in an embodiment of the present invention is provided with a honeycomb segment joined body 10 having a plurality of honeycomb segments 2 integrally joined with one another at a joint face of each of the honeycomb segments 2 by means of a bonding material layer 9 and has a plurality of cells 5 functioning as fluid passages disposed in parallel with one another in a direction of central axis. The honeycomb structure is characterized in that a porosity in an outside portion of the bonding material layer 9 (portion from the interface of the joint face of honeycomb segments to the point corresponding to 20% thickness of the total bonding material layer) is smaller than that in the central portion located on the inner side of the outside portion and that the bonding material layer 9 satisfies the relation of strength (MPa)/Young's modulus (GPa)>$1.0×10^{-3}$.

Figure 3:
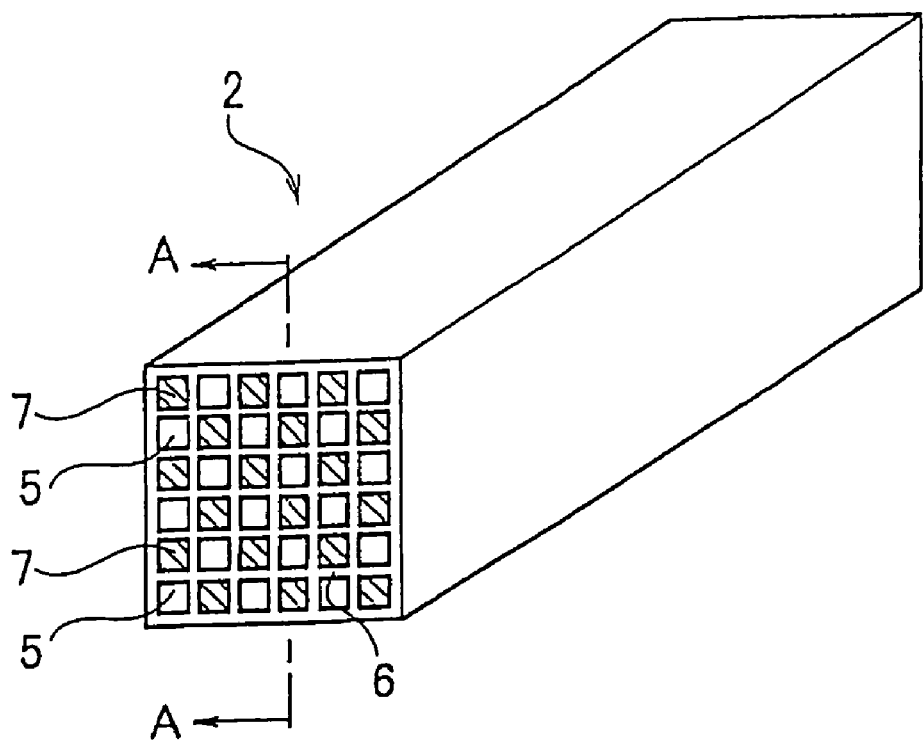
FIG. 3 is a perspective view schematically showing a honeycomb segment used in another embodiment of a honeycomb structure of the present invention.
Figure 4:
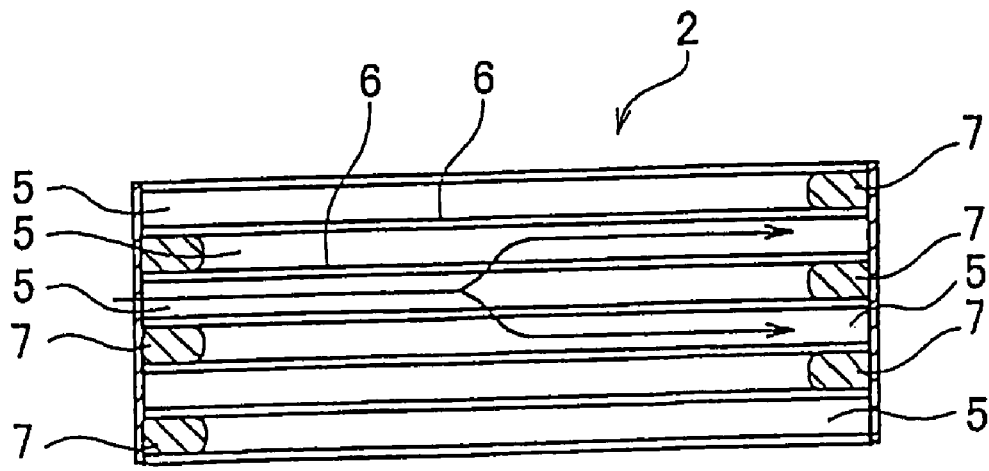
FIG. 4 is a cross-sectional view taken along the A-A line in FIG. 3.

In the first place, a structure of a honeycomb structure 1 in an embodiment of the present invention will be described in more detail. A honeycomb structure 1 in an embodiment of the present invention has a structure in which a plurality of cells 5 partitioned and formed by porous partition walls 6 and works as fluid passages are disposed in parallel with one another in the direction of the central axis of the honeycomb structure 1. The honeycomb structure 1 is constituted as a honeycomb segment joined body 10 in which a plurality of honeycomb segment 2 each of which has a shape for constituting a part of the whole structure and a shape for constituting the whole structure by being assembled in a direction perpendicular to the central axis of a honeycomb structure 1 are integrally joined by means of a bonding material layer 9. After the honeycomb segments 2 are joined by means of a bonding material layer 9, the honeycomb segments 2 are subjected to grinding processing so that the cross-section of the whole structure taken along a plane perpendicular to the central axis of the honeycomb structure 1 may have a shape of a circle, an ellipse, a triangle, a square, or another shape, and the outer peripheral surface is coated with a coating material 4. In the case of using the honeycomb structure 1 as a DPF, by disposing the honeycomb structure 1 in an exhaust gas system, or the like, of a diesel engine, particulate matter containing soot exhausted from the diesel engine can be trapped. In FIG. 1, cells 5 and partition walls 6 are depicted only in one honeycomb segment 2. Each honeycomb segment 2 has a shape for constituting a part of the whole structure of a honeycomb structure 1 (honeycomb segment joined body 10) (see FIG. 1) as shown in FIGS. 3 and 4 and a shape for constituting the whole structure by being assembled in a direction perpendicular to the central axis of the honeycomb structure 1 (see FIG. 1). The cells 5 are disposed to be in parallel with one another in the direction of the central axis of the honeycomb structure 1, and each end portion of cells 5 adjacent thereto are alternately plugged with a filler 7.

Predetermined cells 5 (inflow cells) are opened on the left side end portion in FIGS. 3 and 4 and plugged on the right side end portion with a filler 7. Other cells 5 (outflow cells) adjacent to the predetermined cells 5 are plugged on the left side end portion with the filler 7 and opened on the right side end portion. By such plugging, each of the end portions of the honeycomb segment 2 shows a checkerwise pattern as shown in FIG. 2. In the case that a honeycomb structure 1 where such a plurality of honeycomb segments 2 are joined is disposed in an exhaust gas system, exhaust gas flows into the cells 5 of the each honeycomb segments 2 from the left side shown in FIG. 4 and moves to the right side.

FIG. 4 shows a case that exhaust gas enters from left side of the honeycomb segment 2, and exhaust gas flows into the honeycomb segment 2 from the cells 5 (inflow cells) which are opened without being plugged. The exhaust gas flowing into the cells 5 (inflow cells) passes through porous partition walls 6 and flows out from the other cells 5 (outflow cells). When the exhaust gas passes through the partition walls 6, particulate matter containing soot in the exhaust gas can be trapped by the partition walls 6. Thus, exhaust gas is purified. By such trapping, particulate matter containing soot accumulates inside the honeycomb segments 2 in the course of time to increase pressure loss. Therefore, regeneration is performed to burn soot and the like. Incidentally, though FIGS. 2 to 4 show a honeycomb segment 2 having a square shape as a whole cross-sectional shape, the cross-section may have a shape of a triangle, a hexagon, or the like. In addition, a cross-section of the cells 5 may have a shape of a triangle, a hexagon, a circle, an ellipse, or the like.

A honeycomb structure has the aforementioned structure and characterized in that a porosity in an outside portion of the bonding material layer 9 (portion from the interface of the joint face of honeycomb segments to the point corresponding to 20% thickness of the total bonding material layer) is smaller than that in the central portion located on the inner side of the outside portion and that the bonding material layer 9 satisfies the relation of strength (MPa)/Young's modulus (GPa)>$1.0×10^{-3}$ [preferably, strength (MPa)/Young's modulus (GPa)>2.5×10⁻³, more preferably, strength (MPa)/Young's modulus (GPa)>3.5×10⁻³].

When a porosity in an outside portion of the bonding material layer (portion from the interface of the joint face of honeycomb segments to the point corresponding to 20% thickness of the total bonding material layer) used in the present embodiment is equal to or higher than that in the central portion located on the inner side of the outside portion, the bonding strength of the interface between the segment and the bonding material layer cannot be secured in the outside portion, and the ratio of strength/Young's modulus of the bonding material layer cannot be enhanced by the porosity in the central portion. Therefore, it is impossible to secure both bonding strength at an interface between a segment and a bonding material layer and stress-releasing function of the bonding material layer at the same time.

It is preferable that the outside portion of the bonding material layer used in the present embodiment has a porosity of 5 to 40% and that the central portion has a porosity of 25 to 90%. It is more preferable that the outside portion of the bonding material layer 9 has a porosity of 10 to 30% and that the central portion has a porosity of 30 to 70%. When the porosity in the outside portion is smaller than 5%, the Young's modulus becomes large, and a stress-releasing function may not be exhibited sufficiently. When the porosity in the outside portion is larger than 40%, bonding strength between a segment and a bonding material layer may be lowered. When the porosity in the central portion is smaller than 25%, the Young's modulus becomes large, and if the porosity in the central portion is larger than 90%, strength is lowered, and cracks may be caused. The bonding material layer portion has an average porosity of 17 to 70%, more preferably 22 to 54%.

When the ratio of strength/Young's modulus of the bonding material layer used in the present embodiment is below $1.0 \times 10^{-3}$, improvement in thermal shock resistance can not be achieved sufficiently, and breakage may be caused by sharp thermal stress generated upon regeneration of a DPF.

The bonding material layer used in the present embodiment contains inorganic fiber, and it is preferable the bonding material layer contains, for example, an inorganic binder, an organic binder, an inorganic particle, a foaming particle, and the like, besides the inorganic fiber. Examples of the inorganic fiber include aluminosilicate, alumina, $SiO_2$—MgO based and $SiO_2$—CaO—MgO based oxide fiber, and other fiber (e.g., SiC fiber). Examples of the inorganic binder include silica sol, alumina sol, and clay. Examples of the organic binder include polyvinyl alcohol (PVA), carboxymethyl cellulose (CMC), and methyl cellulose (MC). Examples of the inorganic particle include ceramics such as silicon carbide, silicon nitride, cordierite, alumina, and mullite. Incidentally, as a bonding material constituting the bonding material layer, the same material as the coating material described below may be used.

The content ratio of the inorganic fiber is preferably 20 to 45% by mass (more preferably 30 to 40% by mass), the shot content ratio is preferably 10 to 50% by mass, an average diameter in a cross-section perpendicular to the direction of the longer axis is 1 to 20 μm (more preferably 2 to 15 μm) and an average length in the direction of the longer axis is 10 to 600 μm (more preferably 50 to 300 μm).

When the content ratio of the inorganic fiber is below 20% by mass, it may be impossible to impart elasticity to the bonding material layer. When the content ratio is above 45% by mass, a large amount of water is required to obtain applicable paste. Use of a large amount of water causes large shrinkage upon drying the bonding material, and a crack may be caused. When the shot content ratio is below 10% by mass, a large amount of water is required to obtain applicable paste. Use of a large amount of water causes large shrinkage upon drying the bonding material, and cracks may be caused. When the content ratio is above 50% by mass, it may be impossible to impart elasticity to the bonding material layer. When the average diameter in a cross-section perpendicular to the direction of the longer axis is below 1 μm, it may be impossible to impart elasticity to the bonding material layer. When the average diameter is above 20 μm, it has a large influence on thickness of the bonding material, and therefore, it is sometimes difficult to apply it uniformly on the outer wall surface of the honeycomb segment. When the average length in the longer axis is below 10 μm, it may be impossible to impart elasticity to the bonding material layer. When the average length in the longer axis is above 600 μm, the applicability may be lowered.

As shown in FIG. 2, a bonding material layer 9 is applied on an outer peripheral surface of each of the honeycomb segments 2 to function so that it joins the honeycomb segments 2. The bonding material layer 9 may be applied on the outer peripheral surface of each of the adjacent honeycomb segments 2 or only on one of the opposing outer peripheral surfaces of the adjacent honeycomb segments 2. Such application on only one of the opposing surfaces is preferable in that an amount of the bonding material layer 9 can be saved. The thickness of the bonding material layer 9 is determined in consideration of bonding force between honeycomb segments 2 and appropriately selected, for example, within the range between 0.5 to 3.0 mm.

Examples of the material for the honeycomb segment 2 used in the present embodiment include a material constituted by at least one selected from the group consisting of silicon carbide, silicon-silicon carbide based compound material produced with silicon carbide (SiC) as a framework and silicon (Si) as a bonding material, silicon nitride, cordierite, mullite, alumina, spinel, silicon carbide-cordierite based composite material, silicon-silicon carbide composite material, lithium aluminum silicate, aluminum titanate, and Fe—Cr—Al based metal from the viewpoint of strength and heat resistance. Of these, a material constituted by a silicon carbide (SiC) or silicon-silicon carbide based composite material is preferable.

The honeycomb segment 2 can be manufactured by, for example, adding a binder such as methyl cellulose, hydroxypropoxyl cellulose, hydroxyethyl cellulose, carboxymethyl cellulose, and polyvinyl alcohol, a surfactant, water as a solvent, and the like, to a material appropriately selected from the aforementioned materials, to obtain clay having plasticity, subjecting the clay to extrusion forming to give a formed body having the aforementioned shape, drying the formed body with microwaves, hot air, or the like, and sintering the formed body.

As the filler 7 used for plugging of the cells 5, a material similar to that of the honeycomb segment 2 may be used. Plugging with the filler 7 can be performed by immersing an end face of the honeycomb segment 2 in the slurried filler 7 with the cells 5 which are not to be plugged being masked so that the filler 7 can be filled into only opening cells 5. The filler 7 can be filled before or after firing the honeycomb segment 2 being formed. However, filling before firing is preferable because only one firing process is required.

After manufacturing the honeycomb segment 2 in the above manner, a slurried bonding material 9 is applied on an outer peripheral surface of the honeycomb segment 2, a plurality of honeycomb segments 2 are assembled to give a predetermined solid shape (whole structure of the honeycomb structure 1), press-fitted in this assembled state, and dried by heating. Thus, a joined body having a plurality of honeycomb segments 2 integrally joined is manufactured. Then, the joined body is subjected to grinding processing to give the predetermined shape. The outer peripheral surface is coated with the coating material 4, which is dried by heating. Thus, a honeycomb structure 1 shown in FIG. 1 is manufactured. As a material for the coating material 4, a material similar to that for the bonding material layer 9 can be used. The thickness of the coating material 4 is appropriately selected within the range between 0.1 to 1.5 mm.

As is described above, according to the present invention, there is provided a honeycomb structure which is useful as a trapping filter for exhaust gas, particularly as a diesel particulate filter for trapping particulate matter or the like in exhaust gas from a diesel engine, which is excellent in thermal shock resistance, and where defects such as cracks are securely inhibited from causing particularly upon regenerating the filter.

EXAMPLES

The present invention will hereinbelow be described in more detail with Examples. However, the present invention is by no means restricted by these Examples.

Example 1

Manufacture of Honeycomb Segment

As a honeycomb segment material, SiC powder and metal Si powder were mixed together at the ratio of 80:20 by mass to give a mixture. To the mixture were added starch and a foaming resin as pore formers and further added methyl cellulose, hydroxypropoxylmethyl cellulose, a surfactant, and water to prepare clay having plasticity. The clay was subjected to extrusion forming and dried with microwaves and hot air to obtain a honeycomb segment formed body having a partition wall thickness of 310 µm, a cell density of about 46.5 cells/cm$^2$ (300 cells/inch$^2$), a square cross-section with a side length of 35 mm, and a length of 152 mm. The honeycomb segment formed body was subjected to plugging at both end faces so that each of the end faces shows a checkerwise pattern. That is, plugging was performed so that adjacent cells are plugged at the opposite end portions. As the plugging material, a material similar to that for the honeycomb segment raw material was used. After plugging the both end faces and drying, the binder was degreased at about 400° C. in an ambient atmosphere, and then firing was performed at about 1450° C. in an Ar inert atmosphere to obtain a honeycomb segment having a porous structure, in which SiC crystal particles are bonded with Si.

(Preparation of Bonding Material)

To a mixture of aluminosilicate fiber as an inorganic fiber, colloidal silica and clay as an inorganic binder, and SiC as an inorganic particle was further added water, and were added, in some cases, an organic binder (CMC, PVA), a foaming resin, and a dispersant, followed by kneading by a mixer for 30 minutes to obtain a pasty bonding material. Concretely, bonding materials (bonding materials No. 1 to 16) having various kinds and composition ratios were obtained under the conditions shown in Table 1.

(Manufacture of Honeycomb Structure)

Figure 5:
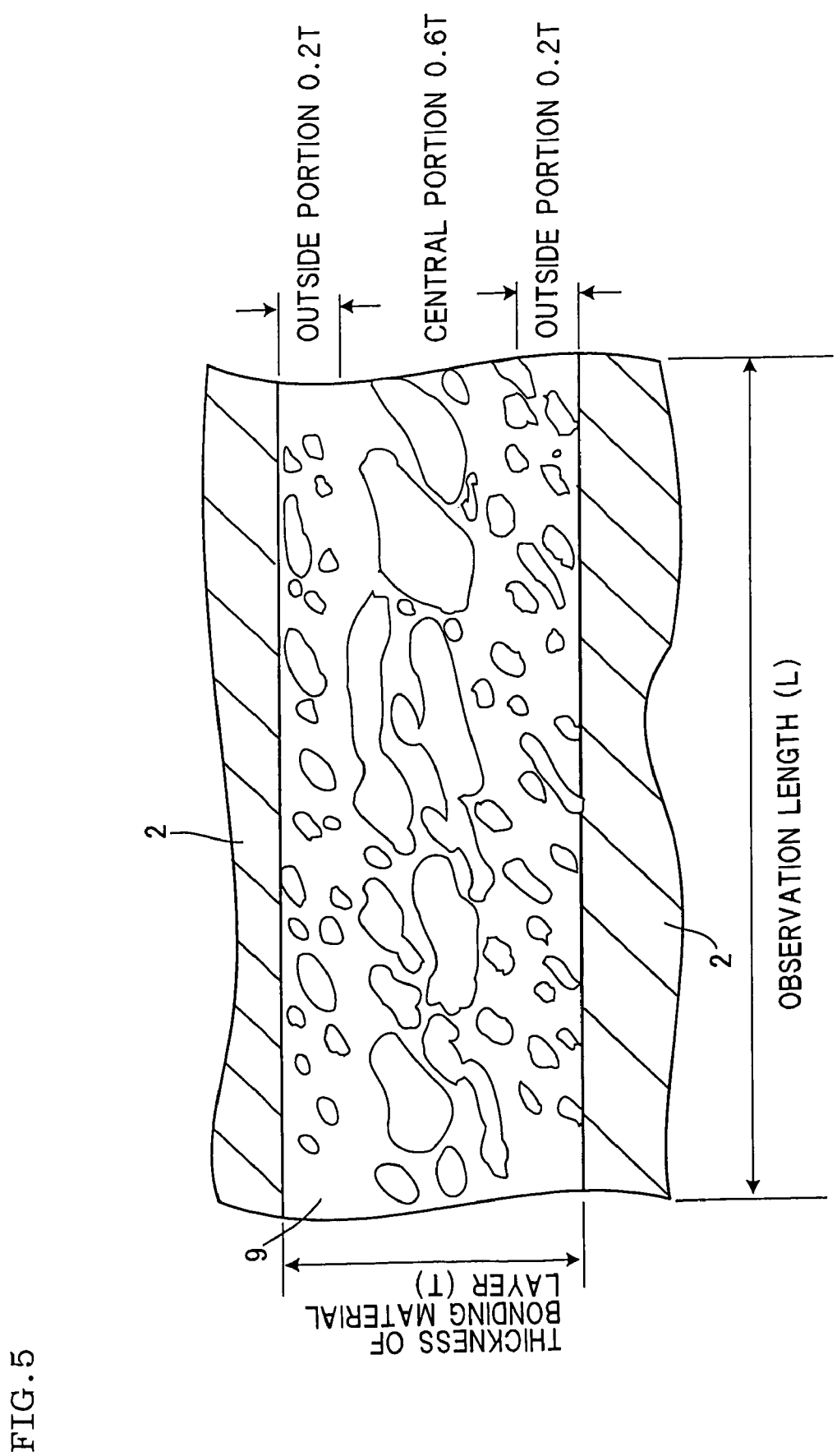
FIG. 5 is an explanatory view schematically showing an observation of a pore distribution by SEM in a cross-section of a sample for measuring porosity obtained in Examples.

The bonding material No. 1 was applied on the outer wall surface of the honeycomb segment to form a bonding material layer having a thickness of about 1 mm, on which another honeycomb segment was mounted. The process was repeated to manufacture a honeycomb segment-laminated body having 16 honeycomb segments. Pressure was applied from outside to join the honeycomb segments, and drying was performed at 140° C. for two hours to obtain a honeycomb segment joined body. Then, the outer periphery of the honeycomb segment joined body was cut to make a cylindrical shape, and the coating material is applied and dried and cured at 700° C. for two hours to obtain a honeycomb structure. After a sample for measuring porosity is cut out from the obtained honeycomb structure, buried in a resin and then polished, a pore distribution state in a cross-section of the sample for measuring porosity was observed by SEM with about 10 to 40 magnifications. The porosity was calculated from image analysis (Image Pro (Ver 5.0) produced by Media Cybernetics) of the photograph obtained. The results of the observation of a pore distribution state is shown in FIG. 5. Upon calculating the porosity, at least length of 3 mm region of the sample was used. The results are shown in Table 2. The porosity in the central portion of the bonding material was 68%, and the porosity in the outside portion was 37%. In addition, a sample for a strength test was cut out and measured for a three point bending strength according to JIS R1601. Young's modulus was calculated from weight and a displacement curve upon measuring the strength. The results are shown in Table 3. The ratio of strength/Young's modulus of the bonding material was $1.2 \times 10^{-3}$. In addition, the obtained honeycomb structure was subjected to a rapid heating test (burner spalling test B-sp), a quick quenching test (electric furnace spalling test E-sp), and an engine test (E/G test). The results are shown in Tables 2 and 3.

Examples 2 to 12 and Comparative Examples 1 to 3

Examples 2 to 12 were obtained in the same manner as in Example 1 except that the bonding material of Example 1 was replaced by the bonding materials No. 2 to 12. Comparative Examples 1 to 3 were obtained in the same manner as in Example 1 except that the bonding material of Example 1 was replaced by the bonding materials No. 13 to 15. The results of various tests of the bonding material of the honeycomb structure in each of the Examples and Comparative Examples are shown in Tables 2 to 3.

TABLE 1

| Bonding material No. | Average length of inorganic fiber (µm) | Average cross-section diameter of inorganic fiber (µm) | Inorganic fiber (mass %) | Organic binder (mass %) | Inorganic particle (mass %) | Others (mass %) |
|---|---|---|---|---|---|---|
| 1 | 75 | 7 | 35.1 | | 40.8 | Dispersant: 0.3 Foamed resin: 1.0 |
| 2 | 125 | 4 | 35.1 | CMC: 0.4 | 40.8 | Dispersant: 0.4 Foamed resin: 1.0 |

TABLE 1-continued

| Bonding material No. | Average length of inorganic fiber (μm) | Average cross-section diameter of inorganic fiber (μm) | Inorganic fiber (mass %) | Organic binder (mass %) | Inorganic particle (mass %) | Others (mass %) |
|---|---|---|---|---|---|---|
| 3 | 175 | 5 | 35.1 | | 40.8 | Dispersant: 0.5 Foamed resin: 1.0 |
| 4 | 50 | 8 | 34.5 | | 41.7 | Dispersant: 0.3 Foamed resin: 1.0 |
| 5 | 100 | 10 | 34.5 | | 41.5 | Dispersant: 0.5 Foamed resin: 1.0 |
| 6 | 200 | 8 | 34.5 | | 41.3 | Dispersant: 0.7 Foamed resin: 1.0 |
| 7 | 50 | 8 | 34.5 | CMC: 0.3 | 42.2 | Foamed resin: 1.0 |
| 8 | 100 | 5 | 34.5 | CMC: 0.4 | 42.1 | Foamed resin: 1.0 |
| 9 | 200 | 5 | 34.5 | CMC: 0.5 | 42 | Foamed resin: 1.0 |
| 10 | 300 | 5 | 34.5 | CMC: 0.8 | 41.7 | Foamed resin: 1.0 |
| 11 | 200 | 5 | 34.5 | PVA: 1.0 | 41 | Foamed resin: 1.0 |
| 12 | 300 | 5 | 34.5 | PVA: 1.2 | 40.8 | Foamed resin: 1.0 |
| 13 | 40 | 7 | 15 | | 52 | Dispersant: 0.3 Foamed resin: 1.0 |
| 14 | 60 | 10 | 23 | | 49 | Dispersant: 0.3 Foamed resin: 1.0 |
| 15 | 50 | 5 | 50.0 | | 26.2 | Dispersant: 0.3 Foamed resin: 1.0 |

Aluminosilicate was used as inorganic fibers, and the shot content ratio was all 50%. SiC was used as inorganic particles, and the particle diameters were 1.4 to 1.9 μm. Each of the bonding materials contained 22% by mass of colloidal silica as an inorganic binder and 1.0% by mass of clay. Each bonding material layer had a thickness of 1 mm.

TABLE 2

| | Bonding material No. | Porosity in outside portion of bonding material layer | Porosity in central portion of bonding material layer | B-sp test | E-sp test | E/G test |
|---|---|---|---|---|---|---|
| Example 1 | 1 | 35 | 70 | 810° C. | Good | Good |
| Example 2 | 2 | 40 | 78 | 890° C. | Good | Good |
| Example 3 | 3 | 30 | 65 | 950° C. | Good | Good |
| Comparative Example 1 | 13 | 47 | 42 | 750° C. | Bad | Bad |
| Comparative Example 2 | 14 | 50 | 41 | 700° C. | Bad | Bad |

TABLE 3

| | Bonding material No. | Strength/ Young's modulus ratio × $10^{-3}$ | Porosity in outside portion of bonding material layer | Porosity in central portion of bonding material layer | B-sp test | E-sp test | E/G test |
|---|---|---|---|---|---|---|---|
| Example 4 | 4 | 1.2 | 37 | 68 | 800° C. | Good | Good |
| Example 5 | 5 | 2.3 | 38 | 71 | 900° C. | Good | Good |
| Example 6 | 6 | 3.8 | 40 | 74 | 950° C. | Good | Good |
| Example 7 | 7 | 2.1 | 19 | 54 | 850° C. | Good | Good |
| Example 8 | 8 | 3.0 | 23 | 62 | 950° C. | Good | Good |
| Example 9 | 9 | 4.1 | 25 | 65 | 1000° C. | Good | Good |
| Example 10 | 10 | 5.4 | 30 | 70 | 1100° C. | Good | Good |
| Example 11 | 11 | 4.3 | 32 | 65 | 1000° C. | Good | Good |
| Example 12 | 12 | 5.8 | 37 | 72 | 1100° C. | Good | Good |
| Comparative Example 3 | 16 | 0.9 | 52 | 50 | 700° C. | Bad | Bad |

[B-sp] test: Burner spalling test (rapid heating test): Air heated by a burner was sent into a honeycomb structure to make a difference in temperature between the central portion and the outside portion of the honeycomb structure. Thermal shock resistance test was given to observe a temperature where cracks are caused in the honeycomb structure (The higher the temperature is, the higher the thermal shock resistance is.).

[E-sp] test: Electric furnace spalling test (quick quenching test): A honeycomb structure having a temperature of 450° C. was heated at 550° C. for two hours in an electric furnace so as to have uniform temperature. Then, the honeycomb structure was taken out in room temperature to evaluate thermal shock resistance depending on the presence/absence of a crack in the honeycomb structure.

[E/G] test: 1000° C. engine test: Accumulated particulate matter was burned to regenerate the filter. Under the condition that temperature of the central portion of the honeycomb structure becomes 1000° C., thermal shock resistance was evaluated depending on the presence/absence of a crack in the honeycomb structure.

In tables 2 and 3, "Good" means that no crack was caused, and "Bad" means that a crack was caused. As understood from the results in Table 2, the structure shown in Nos. 13 and 14 (Comparative Examples 1 and 2) each having lower porosity in the central portion of a bonding material layer than porosity in the bonding material in the outside portion, a crack was generated in each honeycomb structure after various kinds of tests. This is considered that the bonding material layer could not exhibit elasticity sufficient for releasing thermal stress generated during tests. On the other hand, the structure shown in Nos. 1 to 3 (Examples 1 to 3) each having higher porosity in the central portion of the bonding material layer than porosity in the outside portion of the bonding material layer, each of the honeycomb structures did not have any visible crack after the various kinds of tests. In addition, as understood from the results of Table 3, the structure shown in No. 15 (Comparative Example 3) having strength/Young's modulus ratio of below 1.0 of the bonding material layer and having lower porosity in the central portion of the bonding material layer than porosity in the outside portion of the bonding material, a crack was caused in the honeycomb structure after various kinds of tests. This is considered that the bonding material layer could not exhibit elasticity sufficient for releasing thermal stress generated during tests. On the other hand, the structure shown in Nos. 4 to 12 (Examples 4 to 12) having strength/Young's modulus ratio of 1.0 or more of the bonding material layer and having higher porosity in the central portion of the bonding material layer than porosity in the outside portion of the bonding material layer, each of the honeycomb structures did not have any visible crack after the various kinds of tests.

Industrial Applicability

A honeycomb structure of the present invention is useful as a trapping filter for exhaust gas, for example, a diesel particulate filter (DPF) for trapping and removing particulate matter contained in exhaust gas from a diesel engine, or the like.

The invention claimed is:

1. A honeycomb structure comprising a honeycomb segment joined body having a plurality of honeycomb segments integrally joined with one another at a joint face of each of the honeycomb segments by means of a bonding material layer and having a plurality of cells functioning as fluid passages disposed in parallel with one another in a direction of central axis, wherein porosity in an outside portion of the bonding material layer, defined as a portion from the interface of the joint face of honeycomb segments to the point corresponding to 20% thickness of the total bonding material layer, is smaller than that in a central portion located on an inner side of the outside portion, the bonding material layer contains an inorganic fiber having an average length in the direction of the longer axis of 125 μm or more having a shot content ratio of 10 to 50% by mass.

2. The honeycomb structure according to claim 1, wherein the bonding material layer satisfies the relation of strength (MPa)/Young's modulus (GPa)>1.0×10$^{-3}$.

3. The honeycomb structure according to claim 1, wherein the bonding material layer satisfies the relation of strength (MPa)/Young's modulus (GPa)>2.5×10$^{-3}$.

4. The honeycomb structure according to claim 1, wherein the bonding material layer satisfies the relation of strength (MPa)/Young's modulus (GPa)>3.5×10$^{-3}$.

5. The honeycomb structure according to claim 1, wherein the outside portion of the bonding material layer has a porosity of 5 to 40%, and the central portion has a porosity of 25 to 90%.

6. The honeycomb structure according to claim 1, wherein the outside portion of the bonding material layer has a porosity of 10 to 30%, and the central portion has a porosity of 30 to 70%.

7. The honeycomb structure according to claim 1, wherein the inorganic fiber has an inorganic fiber content ratio of 20 to 45% by mass and has an average diameter of 1 to 20 μm in a cross-section perpendicular to the longer axial direction.

8. The honeycomb structure according to claim 1, wherein the bonding material layer has a thickness of 0.5 to 3 mm.

9. The honeycomb structure according to claim 1, wherein the honeycomb segment is constituted by silicon carbide (SiC) or by silicon-silicon carbide based composite material formed by the use of the silicon carbide (SiC) as a framework and silicon (Si) as a bonding material.

* * * * *